D. P. DAGGETT.
Wheel-Cultivator.
No. 18,840. Patented Dec. 15, 1857.
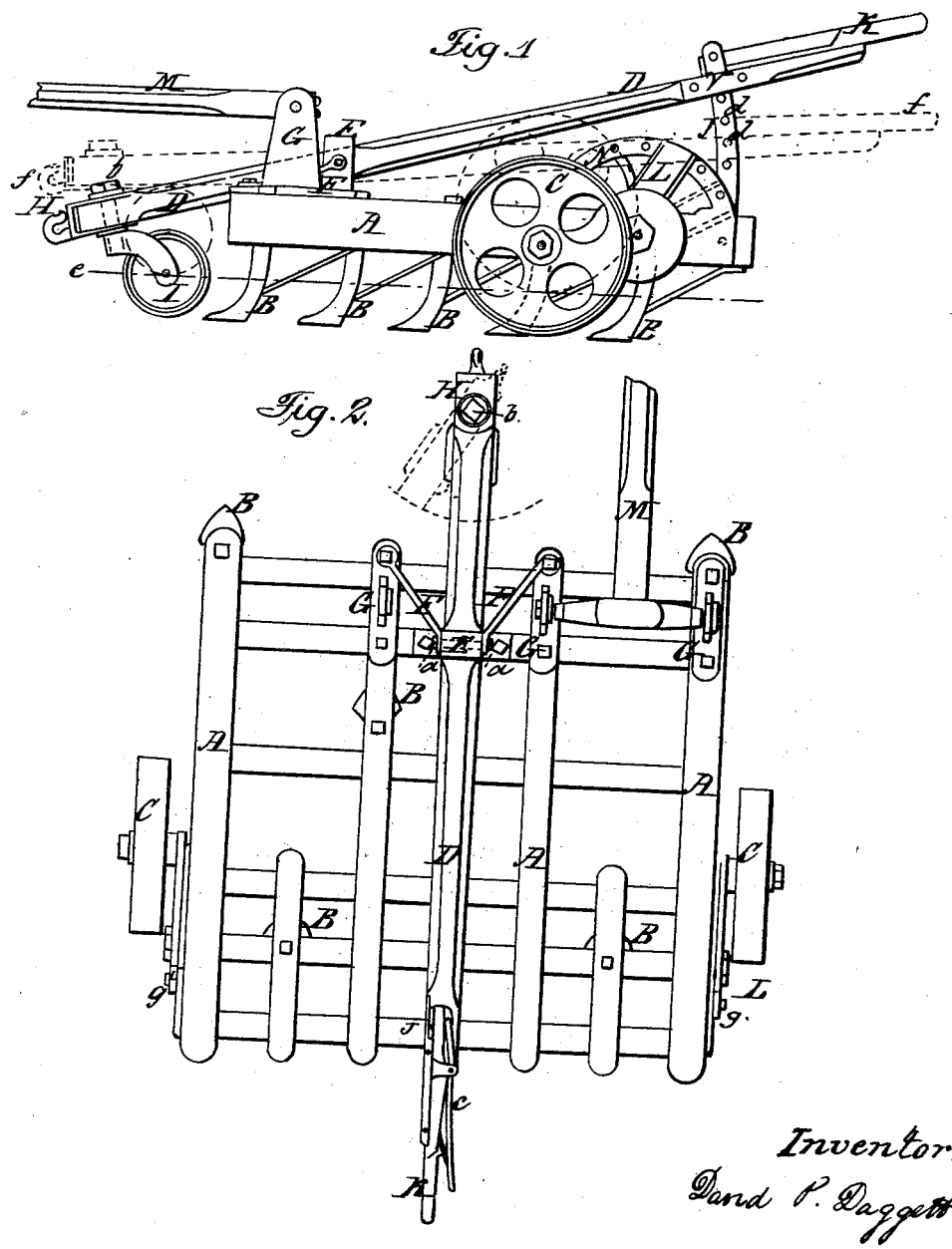
Inventor:
David P. Daggett

UNITED STATES PATENT OFFICE.

DAVID P. DAGGETT, OF PALMYRA, NEW YORK.

IMPROVEMENT IN CULTIVATORS.

Specification forming part of Letters Patent No. 18,840, dated December 15, 1857.

*To all whom it may concern:*

Be it known that I, DAVID P. DAGGETT, of the town of Palmyra, in the county of Wayne and State of New York, have invented a new and Improved Mode of Constructing Cultivators; and I do hereby declare that the following is a full, clear, and exact description of the construction and operation of the same, reference being had to the accompanying drawings, making part of this specification, in which Figure 1 is a side elevation and Fig. 2 a plan view, and to the letters marked thereon.

The same letters refer to like parts in both figures. Fig. 2 gives a general idea of my method of constructing cultivators.

A is the frame. B is the teeth; C, the side wheels.

D is an adjustable draft-beam, which is attached to the frame by a bolt passing through the iron yoke E, which forms its axis or fulcrum. This yoke is thoroughly braced by two short braces, F F, extending from the bolt $a$ to the forward part of the foot of the iron standards G G, by which the construction is rendered unusually strong.

The draft is attached to the forward end of the beam D by the clevis H. To this clevis is attached a caster-wheel, I, Fig. 1, being permanently affixed to it, but the whole moving upon the end of the beam as a swivel, its center of action being the bolt $b$. This swivel-wheel forms the third wheel to the cultivator, and is employed to regulate the depth of the teeth by means of the beam D, the rear end of which slides as it is raised or lowered against the perforated standard J, and is secured by the plate V. The clutch $c$, attached to the rear end of the beam D, falls into the holes $d$ and secures it in its proper position.

The operator has only to clasp the handle K, taking into his hand at the same time the end of the clutch $c$. By gripping his hand he can drop the end of the beam and give the teeth the depth of cut desired, as shown by the dotted lines $e\ e\ f\ f$; and by raising the end of this beam the teeth may be made just to shave the surface, cutting the grass, &c.

When running to or from the field the forward part of the cultivator may be placed upon the strong hook attached to the inner end of the pole, and the whole run upon the side wheels, C C, which are attached to the back part of the cultivator.

The caster or swivel wheel is the governing feature for regulating the depth of the teeth, the greater portion of which are forward of the axis of the side wheels; but these are also adjustable, running upon lever-arms L L, which can be changed and secured to any desired position by the clutch $c$ falling into the holes $d$ in the perforated circle N. By these lever-arms, in combination with the adjustable beam, the cultivator and teeth can be placed in any position desired and settled into the soil with the back part the lowest for working stiff soil with a light team or the forward part the lowest for more thoroughly pulverizing light soil. The swivel-wheel, forming a part of the clevis, follows the team, being little liable to sway by the strong tension on it.

The pole M is attached to the standards G G by a roll, and is used for guiding the machine sidewise and running to and from the field, and not for draft. When using two horses it is placed in the center directly over the beam; but for using three horses abreast it is placed on the right side, as shown in Fig. 2.

What I claim as my invention, and desire to secure by Letters Patent, is—

The peculiar construction and arrangement of parts, whereby the frame of the cultivator may be elevated or depressed in relation to the surface of the soil, either parallel to the plane of the surface or inclined thereto, forward or backward, at any desired angle, by means of the lever-beam D, swivel-wheel I, swivel-clevis H, and adjustable wheels C, combined, arranged, and operating in the manner and for the purpose specified.

DAVID P. DAGGETT.

Witnesses:
LUCIUS H. FOSTER,
ALONZO B. CRANDELL.